UNITED STATES PATENT OFFICE.

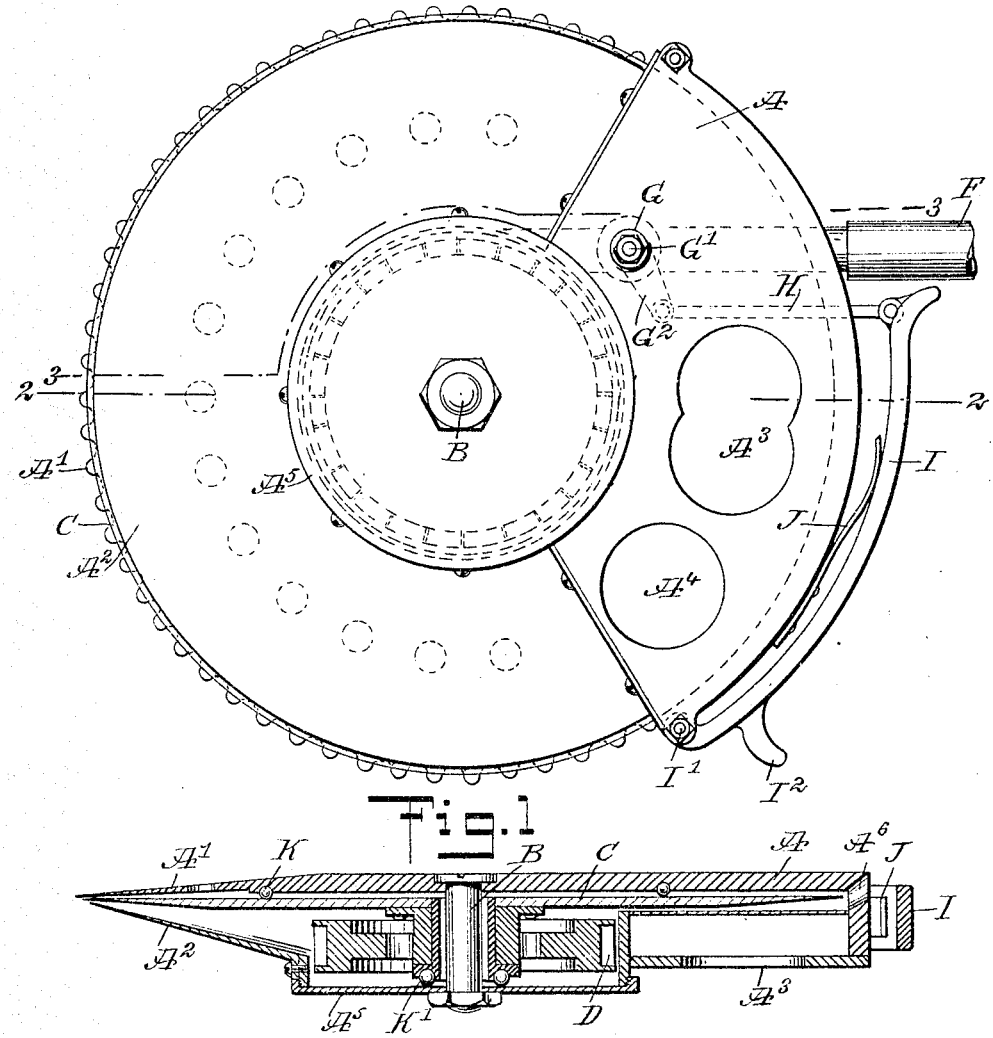

JAMES C. BOYLE, OF CALGARY, ALBERTA, CANADA.

SKINNING-TOOL.

No. 872,272.   Specification of Letters Patent.   Patented Nov. 26, 1907.

Application filed October 19, 1906. Serial No. 339,637.

*To all whom it may concern:*

Be it known that I, JAMES C. BOYLE, a citizen of the United States, and a resident of Calgary, in the Province of Alberta, Dominion of Canada, have invented a new and Improved Skinning-Tool, of which the following is a full, clear, and exact description.

The invention relates to butchering, and its object is to provide a new and improved skinning tool, arranged to permit of quick and accurate skinning of animals without requiring a skilled or expert knife man, and without danger of cutting the flesh or mutilating the hide.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is a cross section of the same substantially on the line 2—2, in Fig. 1; and Fig. 3 is a similar view of the same on the line 3—3 of Fig. 1.

The skinning tool is mounted in a suitably constructed casing A supporting a stud B on which is mounted to rotate a circular knife C extending with its cutting edge between segmental guards A', A$^2$ forming parts of the casing A, and of which the guard A' is provided at its peripheral edge with corrugations, as plainly indicated in Fig. 1.

On one face of the knife C is secured a rotary motor D of any approved construction, and adapted to be driven by a suitable motive agent, such as compressed air and the like, delivered to the peripheral buckets of the motor D by a nozzle E secured on the casing A, and connected by a flexible tube F with a suitable supply of motive agent.

The nozzle E is provided with a valve G carrying on its valve stem G' an arm G$^2$ connected by a link H with a hand lever I fulcrumed at I' on the outside of the casing A and at the peripheral face thereof, as plainly indicated in the drawings. A spring J presses the hand lever I to normally hold the same in an outermost position and the valve G in a closed position, but when the tool is in use and the operator has hold of the casing A by inserting the fingers in finger holes A$^3$, A$^4$ and presses with the palm of the hand the lever I then the valve G is opened to allow the motive agent to pass to the motor D to rotate the same, and consequently the knife C.

The hand lever I is preferably provided with a lug I$^2$ for the palm of the operator to butt against. As shown in Figs. 1 and 2 the hand holes A$^3$, A$^4$ are preferably arranged in the front of the casing to permit the operator to conveniently take hold of the casing and move the same about, to bring the cutting edge of the knife C in proper position between the skin and the flesh with a view to sever the same. Now, by having the peripheral cutting edge of the knife C extend between the guards A', A$^2$, it is evident that the cutting edge is not liable to cut unduly into the flesh or to mutilate the hide. By reference to Figs. 2 and 3 it will be seen that the guard A' is approximately straight while the guard A$^2$ is inclined to keep the cutting edge of the knife as free as possible from the skin and flesh to allow free rotation and proper cutting of the knife when the device is used.

By reference to Fig. 1 it will be seen that the cutting edge of the knife C extends approximately midway between the length of the corrugations on the guard A' to permit the cutting edge to readily cut the flesh but not to allow the hide to pass between the corrugations and be scored. In order to insure an easy running of the knife C, suitable ball bearings K and K' are provided, of which the ball bearings K are interposed between one face of the knife C and the opposite inner face of the casing A, and the ball bearings K' are interposed between one end of the hub of the knife C and the cap A$^5$ screwing centrally on the casing A. In order to permit convenient sharpening of the cutting edge of the circular knife C, the casing is provided with an aperture A$^6$ (see Fig. 2) for the insertion of a sharpening steel.

The skinning tool as shown and described is very simple and durable in construction, and can be readily manipulated without requiring a skilled or expert knife man and without danger of cutting the flesh or mutilating the hide.

Although I have shown and described a motor directly attached to the rotary knife, it is evident that other suitable means may be employed for rotating the circular knife, and hence I do not limit myself to the particular means shown and described.

Having thus described my invention, I claim as new and desire to secure by Letters Patent:

1. A skinning tool, comprising a flat casing segmental knife guards forming part of said casing, one of which is straight and the other extends at an angle to the straight guard, the straight guard having projections at its edge extending beyond the inclined guard, a circular knife mounted to revolve in the said casing and having its cutting edge extending between the guards, a rotary motor on the said knife within the casing, and a supply tube on the casing and discharging the motive agent into the said motor.

2. A skinning tool comprising a casing, spaced segmental guards forming part of said casing, one of said guards being straight and corrugated at its edge and the other being inclined to the straight guard, a circular knife mounted to rotate in the said casing and extending with its cutting edge between the said guards, the circular cutting edge of the knife extending approximately midway of the length of the corrugations on the straight guard, and means for rotating the said knife.

3. A skinning tool comprising a casing having a portion inclosing part of the cutting edge of the knife, the said portion being provided with finger holes, segmental knife guards forming part of the casing, a circular knife mounted to revolve in the said casing and having its cutting edge extending between the guards, a rotary motor on the said knife within the casing, means on the casing for discharging the motive agent into the said motor, and means for controlling the supply of motive agent to the motor, the said means including a hand lever fulcrumed on the outside of the casing and located adjacent to the finger holes.

4. A skinning tool comprising a casing having a portion adapted to inclose part of the cutting edge of the knife, the said portion being provided in its periphery with an aperture leading to the cutting edge of the knife for the insertion of a sharpening tool, the said portion of the casing being further provided with finger holes, segmental knife guards forming part of the casing, a circular knife mounted to rotate in the said casing and having its cutting edge extending between the guards, and means for rotating said knife.

5. A skinning tool comprising a casing having an opening in one of its faces, a cap for closing said opening, a central stud supported by the casing, spaced guards forming part of the casing, a circular knife having a hub mounted to turn on said stud, the said knife having its cutting edge extending between the guards, ball bearings interposed between one face of said knife and the inner face of the casing, ball bearings interposed between the end of the hub and the said cap, and a motor on the knife within the casing for rotating the said knife.

6. A skinning tool comprising a flat casing, segmental knife guards forming part of said casing, one of said guards being straight and the other extending at an angle to the straight guard, the said straight guard having spaced projections at its edge extending beyond the edge of the inclined guard, a circular knife mounted to revolve in the said casing, and having its cutting edge extending between the guards, a rotary motor on the said knife within the casing, a supply tube on the casing and discharging the motive agent into the said motor, the casing being provided in the face opposite the motor with a central opening and a screw-cap for closing said opening.

7. A skinning tool comprising a casing having a circular opening in one of its faces, a cap screwing on said casing and closing said opening, a central stud secured to the cap and the opposite face of the casing, spaced guards forming part of the casing, and a circular knife having a hub mounted to turn on said stud, the cutting edge of the knife extending between the guards, the said hub being supported by the screw cap.

In testimony whereof I have signed my name to this specification in the presence of two subscribing witnesses.

JAMES C. BOYLE.

Witnesses:
L. P. STRONG,
E. S. HOTCHKISS.